Figure 1:
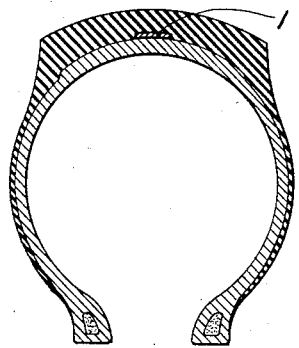

Feb. 22, 1944.   J. H. FIELDING   2,342,576
TIRE CONSTRUCTION
Filed Aug. 1, 1941

Inventor
John H. Fielding

By

Attorney

Patented Feb. 22, 1944

2,342,576

UNITED STATES PATENT OFFICE 2,342,576

TIRE CONSTRUCTION

John H. Fielding, Akron, Ohio, assignor to Wingfoot Corporation, Akron, Ohio, a corporation of Delaware Application August 1, 1941, Serial No. 405,039

5 Claims. (Cl. 152—151)

This invention relates to a tire construction and, more particularly, to a tire which has a lessened tendency to develop electrical charges during operation of the tire.

Rubber compounds which have been employed in the construction of tires have a relatively high resistance to the flow of electricity. When such tires are operated in the ordinary use they tend to build up substantial electrical charges, which are believed to be largely due to the frictional wiping action of the tire against the road and may also be partly due to the action of air against the tire and to the frictional movement of internal tire elements and to the internal flexing of the rubber itself. Because of the relatively high resistivity of the rubber compounds normally employed, these electrical charges can built up to very high voltages and these voltages have various detrimental and sometimes hazardous effects. For example, when a vehicle comes to a sudden stop and the door handle is touched by a person standing on the ground, before the static electricity has had time to leak off from the vehicle, a very uncomfortable shock may be experienced by the person. If a gasoline attendant touches the gas tank of the vehicle a spark may result, creating the danger of explosion of the gasoline. In addition, during the operation of the vehicle, when the voltage builds up to a sufficiently high potential, there is a continuous intermittent discharge or leakage of the electricity and this sometimes causes the formation of ozone around and within the tire and this ozone causes accelerated ageing and oxidation of the rubber, sometimes evidenced by surface checking of the interior of the tire and the exterior of its inner tube. These static discharges during the operation of the car also cause radio interference.

Several methods have been proposed for reducing the tendency of tires to build up static charges. One of these has been to make the tread of the tire from rubber which has a relatively high electrical conductivity. This method is satisfactory for some purposes but for others has the disadvantage that rubber of high conductivity may have a greatly lessened resistance to abrasion and may have other undesirable characteristics. Several means have been proposed for completely grounding the tire, wheel and frame of the vehicle on the theory that such complete grounding should give optimum results.

According to the present invention, it has been found that greatly improved performance of the tire can be obtained by placing a strip or layer of highly conductive material beneath the tread of the tire. This strip is not of such width as to contact the beads or rim contacting portion of the tire and therefore the tire is not in electrical contact with the rim, wheel or body of the vehicle. At the same time, the tread of the tire can be made of relatively non-conducting rubber compounded particularly for resistance to abrasion or other desired physical characteristics. Such a tire combines desirable electrical characteristics with desirable physical characteristics and it has been found that such a construction gives a greatly improved electrical performance over any of the previously proposed or employed constructions.

Figure 5:
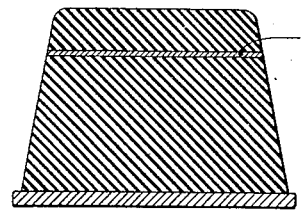
Figure 6:

The invention is illustrated by the attached drawing in which Figures 1–4 are cross-sections of pneumatic tires showing certain variations in the positioning of the conductive layer; Figure 5 shows the application of the invention to a solid tire, and Figure 6 is a cross-section of a tread and sidewall strip with a layer of conductive material placed beneath the tread, the composite structure being adapted to be placed on a tire carcass.

Figure 2:
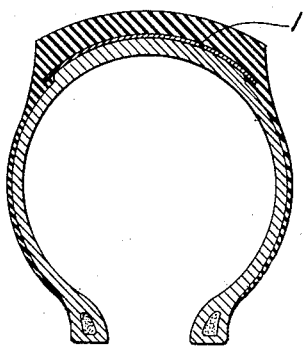
Figure 3:
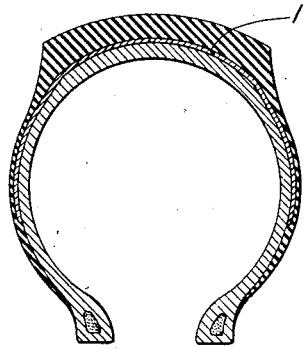
Figure 4:
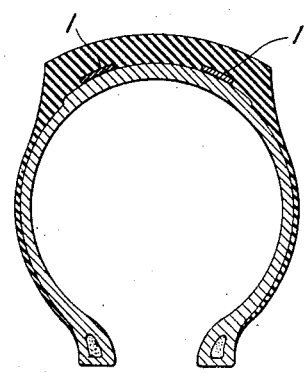

The conductive layer may be a relatively narrow circumferential strip, as shown in Figure 1, or the layer may be substantially coextensive with the tread of the tire, as shown in Figure 2. If desired, the conductive layer may be continued up along the sidewalls of the tire, as shown in Figure 3, but in no case should it be carried up to the bead portion of the tire and it is desirable to have a substantial distance between the edge of the conductive layer and the beads or rim contacting portions of the tire. If desired, a plurality of conductive strips may be used as shown in Figure 4. The preferred construction is that shown in Figures 2 and 5 in which the conductive layer is substantially coextensive with the tread of the tire. In each of the figures, the conductive strip or layer is designated with the number 1. The remainder of the tire is preferably built from conventional rubber compounds which ordinarily have a high resistivity and it is particularly desirable that the sidewall portion of the tire should be of non-conductive rubber to prevent transmission of the static electricity through the sidewalls to the wheel and thence to the body of the vehicle.

The conductive layer which underlies the tread may be of various compositions, for example, it may consist of metallic or metalloid wires or fabric or it may be a cellulosic or other fabric impregnated with a conductive material. Preferably, however, the layer consists of a rubber stock suitably compounded according to methods which are now becoming well known to give the rubber a relatively high conductivity. Various materials may be added to the rubber to produce this effect, including metals and metalloids, but a preferred material is a conductive type of carbon black, such as those sold under the trade name Shawinigan acetylene black, Statex black, and certain forms of channel black, sold under a variety of trade names. These blacks are added in relatively high proportions, for example, about 30–100 parts of black per 100 parts of rubber, although the loadings may be varied in accordance with the desired physical and electrical characteristics.

What is meant by rubber having high electrical conductivity may be explained as follows. The resistances of various samples of compounded rubber were measured by curing unguarded brass electrodes into opposite faces of the rubber. The electrodes were one square inch in area and were spaced about one-eighth inch apart. A potential of about 1½ to 7½ volts was then impressed across the electrodes and the resistance was measured. The resistivity was calculated in the conventional manner as ohm-centimeters. For numerical convenience it is customary to take the common logarithm of the resistivity and call it the "log resistivity."

A normal tire tread stock usually has a log resistivity between 5.0 and 7.0 although, in some cases it may range from about 4.0 to about 9.0. The highly conductive layer employed in the present invention should have a log resistivity of 3.0 or less and preferably 2.0 or less.

The effectiveness of the invention is illustrated by a tire test in which a set of tires was built according to conventional design with a tread having intentionally poor conductivity (log resistivity=9.25). In operation, these tires developed a potential of over 16,000 volts (this being the highest value which could be measured with the instruments employed). Static interference in the car's radio was very bad. Another set of tires like the first, with the same non-conductive tread stock, but with a circumferential layer of conductive rubber (log resistivity=2.75) under the tread as shown in Figure 2 developed a potential of only 3500 volts, which is in a safe range, not detectable by touching the door handle on the car. Radio interference was barely noticeable.

A tire may be constructed according to standard methods by building a tire carcass and placing upon this carcass in the tread area the conductive layer of material and finally placing over the conductive material the tread material or, if desired, the conductive material may be laid on the tread or tread and side-wall strip, as shown in Figure 6, and the composite strip laid around the tire carcass.

A tire built according to the described construction has been found by actual test to give outstanding results in the elimination of radio static and other static electrical effects caused by operation of the tire. It is believed that these outstanding results are derived by stopping the flow of electricity to the body of the vehicle and by preventing its discharge from the tire to the surrounding atmosphere by concentrating the charges in the conductive strip and causing them to flow along the conductive strip to a point opposite the point of contact with the ground from whence they can bleed through the relatively short thickness of the tread to the ground. If desired, the tread may also be made of conductive rubber but this is not necessary and the tread rubber is preferably compounded primarily for the purpose of obtaining abrasion resistance and other desirable physical characteristics.

I claim:

1. A static-resistant tire comprising a circumferential layer of rubber having high electrical conductivity, said layer underlying the tread of the tire but terminating short of the beads or rim-contacting portions of the tire.

2. A static-resistant tire comprising a layer of rubber having high electrical conductivity, said layer underlying the tread of the tire but terminating short of the beads or rim-contacting portions of the tire.

3. A static-resistant tire comprising a circumferential layer of rubber having high electrical conductivity, said layer underlying the tread of the tire and being confined to the tread portion of the tire.

4. A static-resistant tire comprising a rubberized fabric, toroidally-shaped tire carcass, and plurality of circumferentially-extending, laterally-separated layers of rubber having high electrical conductivity, said layers being associated with and forming a part of the tread of the tire and terminating short of the beads or rim-contacting portions of the tire.

5. A static-resistant pneumatic tire comprising a carcass portion, a tread portion having a log resistivity between about 5.0 and about 7.0, and a layer of highly conductive rubber positioned between the tread and the carcass and terminating short of the beads or rim-contacting portions of the tire, said conductive rubber layer having a log resistivity of less than about 3.0.

JOHN H. FIELDING.